(12) United States Patent
Sharma et al.

(10) Patent No.: US 9,120,925 B2
(45) Date of Patent: Sep. 1, 2015

(54) CARBONATE BLEND COMPOSITION HAVING IMPROVED RESISTANCE TO ENVIRONMENTAL STRESS CRACKING

(75) Inventors: Rahul Sharma, Lake Jackson, TX (US); Thomas Oswald, Lake Jackson, TX (US); Jill Martin, Pearland, TX (US)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 13/576,839

(22) PCT Filed: Apr. 21, 2011

(86) PCT No.: PCT/EP2011/002048
§ 371 (c)(1),
(2), (4) Date: Nov. 2, 2012

(87) PCT Pub. No.: WO2011/128119
PCT Pub. Date: Oct. 20, 2011

(65) Prior Publication Data
US 2013/0131257 A1    May 23, 2013

Related U.S. Application Data

(60) Provisional application No. 61/323,993, filed on Apr. 14, 2010.

(51) Int. Cl.
| | | |
|---|---|---|
| *C08L 69/00* | (2006.01) | |
| *C08L 67/02* | (2006.01) | |
| *C08L 51/08* | (2006.01) | |

(52) U.S. Cl.
CPC .............. *C08L 69/00* (2013.01); *C08L 67/02* (2013.01); *C08L 51/085* (2013.01); *C08L 2205/03* (2013.01)

(58) Field of Classification Search
CPC ....... C08L 51/085; C08L 67/02; C08L 69/00; C08L 2205/03
USPC .......................... 525/439, 446, 464, 466, 474
See application file for complete search history.

(56) References Cited

U.S. PATENT DOCUMENTS

| | | |
|---|---|---|
| 2,465,319 A | 3/1949 | Rex et al. |
| 3,028,365 A | 4/1962 | Schnell et al. |
| 3,047,539 A | 7/1962 | Pengilly |
| 3,169,121 A | 2/1965 | Goldberg |
| 3,419,634 A | 12/1968 | Vaughn |
| 3,431,224 A | 3/1969 | Goldblum |
| 3,756,986 A | 9/1973 | Russell |
| 4,156,069 A | 5/1979 | Kesten et al. |
| 4,260,731 A | 4/1981 | Mori et al. |
| 4,401,804 A | 8/1983 | Wooten et al. |
| 4,529,791 A | 7/1985 | Glass |
| 4,532,290 A | 7/1985 | Jaquiss et al. |
| 4,677,162 A | 6/1987 | Grigo et al. |
| 4,888,388 A | 12/1989 | Hongo et al. |
| 4,963,619 A | 10/1990 | Wittmann et al. |
| 5,087,663 A | 2/1992 | Laughner |
| 5,124,402 A | 6/1992 | Laughner et al. |
| 5,189,091 A | 2/1993 | Laughner |
| 5,262,476 A | 11/1993 | Laughner |
| 5,369,154 A | 11/1994 | Laughner |
| 5,461,092 A | 10/1995 | Laughner |
| 5,922,816 A | 7/1999 | Hamilton |
| 5,981,661 A | 11/1999 | Liao et al. |
| 6,727,301 B1 | 4/2004 | Eckel et al. |
| 6,767,943 B1 | 7/2004 | Eckel et al. |
| 7,223,812 B2 | 5/2007 | Seidel et al. |
| 7,645,850 B2 | 1/2010 | Freitag |
| 2005/0085589 A1 | 4/2005 | Kim |
| 2007/0155857 A1 | 7/2007 | Lee et al. |
| 2008/0090961 A1 | 4/2008 | Li et al. |
| 2009/0043053 A1* | 2/2009 | Gorny et al. ................... 525/451 |
| 2009/0198010 A1 | 8/2009 | Eckel et al. |
| 2009/0214868 A1* | 8/2009 | Mohite et al. ................. 428/407 |
| 2009/0247673 A1* | 10/2009 | Moulinie et al. .............. 524/108 |
| 2010/0204390 A1 | 8/2010 | Hayata et al. |

FOREIGN PATENT DOCUMENTS

| | | |
|---|---|---|
| EP | 2204418 A1 | 7/2010 |
| EP | 2 377 899 A1 | 10/2011 |
| JP | 2001-139789 A | 5/2001 |
| JP | 2011-137059 A | 7/2011 |
| WO | 92/03504 A1 | 3/1992 |

(Continued)

OTHER PUBLICATIONS

Black, J., et al.; Handbook of Biomaterial Properties, 1998, p. 281-282.*
Corresponding PCT Application No. EP2011/002048 filed Apr. 21, 2011; Published as WO 2011/128119 A1 on Oct. 20, 2011.
International Search Report dated Aug. 1, 2011 ; for Corresponding PCT Application No. EP 2011/002048 filed Apr. 2011.
Yanagase et al., Silicone-Based Impact Modifiers for Poly(vinyl chloride), Engineering Resins, and Blends, Journal of Polymer Science: Part A: Polymer Chemistry, 2004, 1112-1119, vol. 42, Wiley Periodicals, Inc.

(Continued)

*Primary Examiner* — Robert Jones, Jr.
(74) *Attorney, Agent, or Firm* — The Dobrusin Law Firm, P.C.

(57) ABSTRACT

The present invention relates to carbonate blend compositions demonstrating improved environmental stress crack resistance in combination with an excellent blend of impact, thermal, and physical properties. Said carbonate blend composition comprises a polycarbonate, a polyester, and a silicon-containing graft (co)polymer having a core-shell morphology, comprising a shell that contains (co)polymerized alkyl(meth)acrylate and glycidyl methacrylate grafted to a composite rubber core that contains polyorganosiloxane and poly(meth)alkyl acrylate components and methods to make said compositions.

16 Claims, 3 Drawing Sheets

(56) References Cited

FOREIGN PATENT DOCUMENTS

| WO | 2008/127286 A2 | 10/2008 |
|---|---|---|
| WO | 2009/037974 A1 | 3/2009 |
| WO | 2011/128119 A2 | 10/2011 |
| WO | 2011/130754 A1 | 10/2011 |

OTHER PUBLICATIONS

Virex II 256 Super Concentrate Disinfectant Cleaner, Material Safety Data Sheet, Apr. 19, 2000, Johnson Wax Professional, Sturtevant, WI.
Cavicide, Material Safety Data Sheet, Aug. 31, 1999, Metrex Research Corporation, Parker, CO.
WEX-CIDE-128, Material Safety Data Sheet, Oct. 2, 2007, Wexford Labs, Inc., Kirkwood, MO.
CIDEXPLUS 28 Day Solution, Material Safety Data Sheet, May 21, 2007, Advanced Sterilization Products, Irvine, CA.
Activator for CIDEXPLUS 28 Day Solution, Material Safety Data Sheet, May 21, 2007, Advanced Sterilization Products, Irvine, CA.
CIDEX OPA Solution, Material Safety Data Sheet, Oct. 1, 2007, Advanced Sterilization Products, Irvine, CA.
Written Opinion dated Oct. 14, 2012; for Corresponding PCT Application No. EP 2011/002048 filed Apr. 2011.
International Preliminary Report of Patentability dated Oct. 14, 2012; for Corresponding PCT Application No. EP 2011/002048 filed Apr. 21, 2011.
1 Chinese office action for Chinese Application No. 201180018615.1.
Japanese Office Action for Japanese Patent Application No. 2013-504172 dated Dec. 16, 2014.
Chan-Seok Park *Crystallinity Morphology and Dynamic Mechanical Characteristics of PBT Polymer and Glass Fiber-Reinforced Composites*, Dec. 31, 2001.
H.-J. Radusch *Chapter 8 Poly(Butylene Terephthalate)* 2002.
*Calibre Polycarbonate Resins* SPE/ANTEC 2001 Proceedings p. 2789.
SPE/ANTEC 1999 Proceedings p. 2111, M. Xanthos, *Department of Chemical Engineering Chemistry and Enivronmental Science*.
http://www.styron.com/ *Calibre Polycarbonate Resins* Oct. 23, 2014.

\* cited by examiner ns thereof.
CARBONATE BLEND COMPOSITION HAVING IMPROVED RESISTANCE TO ENVIRONMENTAL STRESS CRACKING

CLAIM OF BENEFIT OF FILING DATE

The present application is a national phase application of and claims the benefit of the PCT Application EP2011/002048, filed Apr. 21, 2011 and Provisional Application 61/323,993, filed 14 Apr. 2010, the contents of which are hereby incorporated by reference in their entirety.

FIELD OF THE INVENTION

The present invention relates to carbonate blend compositions comprising a polycarbonate, a polyester, and a silicon-containing graft (co)polymer having a core-shell morphology, preferably comprising a shell that contains polymerized alkyl(meth)acrylate and glycidyl methacrylate grafted to a composite rubber core that contains polyorganosiloxane and poly(meth)alkyl acrylate components and methods to make said compositions. The carbonate blend composition further demonstrates an excellent blend of properties including improved solvent resistance. The carbonate blend composition is particularly suited for use in molded articles used for medical applications.

BACKGROUND OF THE INVENTION

Polycarbonate (PC) and blends of polycarbonate with acrylonitrile, butadiene, and styrene terpolymer (PC/ABS) have found many uses in general, and specifically in medical devices, because polycarbonate combines a high level of heat resistance, transparency, good impact resistance, and it is easily molded. However, the prevalence of hospital acquired infections (HAI) requires medical devices to be exposed to a variety of commonly used cleaning liquids and polycarbonate, even blended with ABS, can suffer from a tendency to craze and crack under the effects of residual molded-in stresses, especially when contacted with such cleaning solutions. Polycarbonate which has crazed is, undesirably, more likely to experience brittle rather than ductile failure. This disadvantage has been somewhat relieved by the practice of blending polycarbonate with various substances such as the olefin polymers polyethylene, polypropylene, polyisobutylene, polyphenyleneoxide, or polyester as described for example in U.S. Pat. Nos. 3,431,224; 5,189,091; 5,262,476; 5,369,154; and 5,461,092. These added substances are capable of improving the resistance of polycarbonate to solvents, but they tend to cause an offsetting reduction in impact resistance and weldline strength of the blended composition. Additionally, it is frequently found that when the polycarbonate is modified with substances such as polyolefins, the added substances tend to separate in the blend from the polycarbonate and delaminate as evidenced by peeling or splintering. It would accordingly be desirable if substances admixed with polycarbonate for the purpose of improving the environmental stress crack resistance (ESCR) thereof (e.g. chemical resistance) did not also deleteriously affect its impact strength and weldline strength, and cause delamination as evidenced by peeling or splintering.

SUMMARY OF THE INVENTION

The present invention is such a carbonate blend composition which demonstrates good chemical resistance along with a good blend of thermal, impact, and mechanical properties.

In one embodiment, the carbonate blend composition of the present invention comprises (i) an aromatic polycarbonate or an aromatic polyester carbonate, preferably in an amount of from 5 parts to 95 parts, preferably having a melt flow rate of from 3 to 20 grams per 10 minutes (g/10 min) as determined at 300° C. under a load of 1.2 kilograms; (ii) an aromatic polyester, preferably in an amount of from 5 parts to 95 parts, preferably having a degree of crystallinity of from 25 to 60 percent; (iii) a silicon-containing graft (co)polymer having a core-shell morphology, comprising (iii.a) a composite rubber core that contains polyorganosiloxane and poly(meth)alkyl acrylate components and (iii.b) a grafted shell that contains polymerized glycidyl methacrylate and alkyl(meth)acrylate components, preferably (iii) is present in an amount of from 0.5 parts to 25 parts, more preferably from 5 parts to 25 parts; optionally (iv) one or more of a non-glycidyl(meth)acrylate-containing graft copolymer, and optionally (v) one or more of a flame retardant additive, a charring agent, an anti drip agent, a filler, a reinforcing material, a stabilizer, a pigment, a dye, a mold release, a lubricant, an anti-static agent, or combinations thereof.

In a preferred embodiment of the present invention the graft shell (iii.b) comprises: (iii.b.1) from 1 to 20 percent glycidyl(meth)acrylate and (iii.b.2) from 99 to 80 methyl methacrylate.

In one embodiment, the carbonate blend composition described herein above has a crystallinity of at least 9 percent.

Preferably the aromatic polyester is polyethylene terephthalate (PET) or polybutylene terephthalate (PBT).

In another embodiment of the present invention, the carbonate blend composition described herein above further comprises from 1 to 20 percent by weight based on the total weight of the carbonate blend composition of one or more flame retardant additive selected from a phosphorous containing compound, an oligomeric phosphate, a halogenated compound, a poly(block-phosphonato-ester), and/or a poly (block-phosphonato-carbonate).

In yet another embodiment of the present invention, the carbonate blend composition described herein above further comprises from 100 to 10,000 ppm based on the total weight of the carbonate blend composition of one or more of a metal salt, an anti drip agent, or combinations thereof.

Another embodiment of the present invention is a molded article, preferably a medical device comprising the carbonate blend composition described herein above.

DETAILED DESCRIPTION OF THE INVENTION

Figure 1:
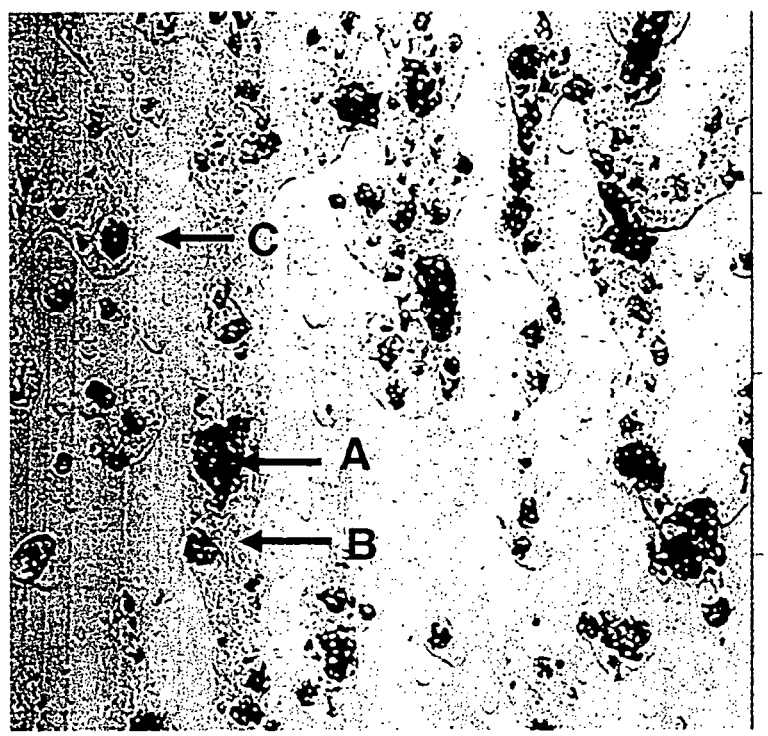
FIG. 1 is a copy of an Atomic Force Microscopy (AFM) image showing the morphology of a carbonate blend composition of the present invention.
Figure 2:
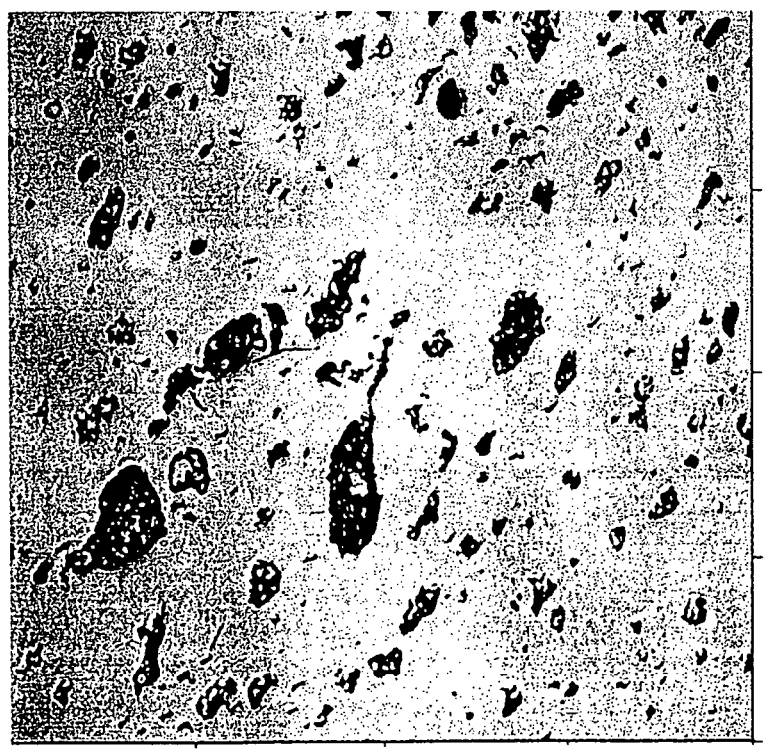
FIG. 2 is a copy of an AFM image showing the morphology of a second carbonate blend composition of the present invention.
Figure 3:
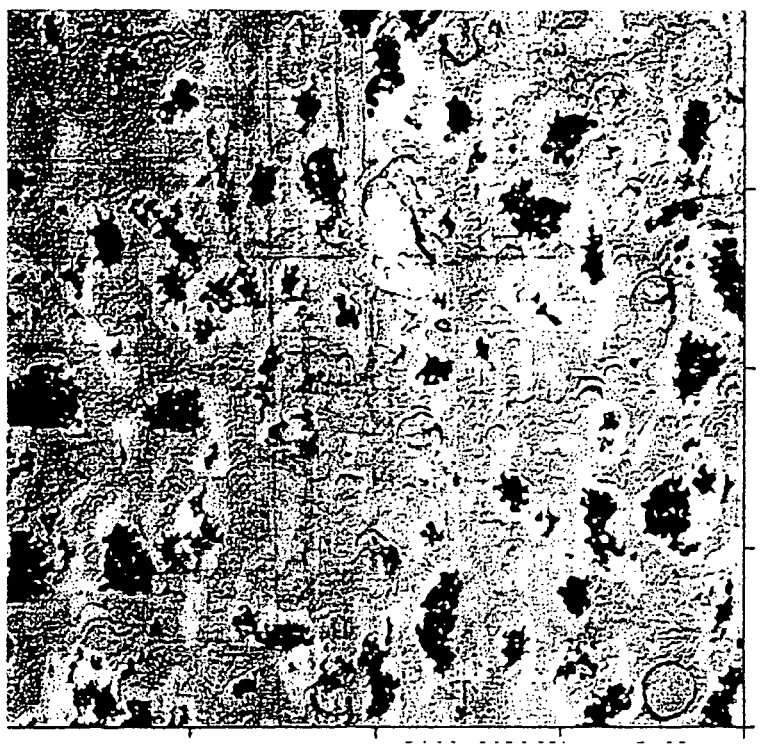
FIG. 3 is a copy of an AFM image showing the morphology of a carbonate blend composition that is not an example of the present invention.

Component (i) of the present invention is a thermoplastic aromatic polycarbonate and/or aromatic polyester carbonate.

Suitable aromatic polycarbonates and/or aromatic polyester carbonates according to the invention are known from the literature or can be produced by methods known from the literature (for example, for the production of aromatic polycarbonates, see Schnell, "Chemistry and Physics of Polycarbonates", Interscience Publishers, 1964, as well as U.S. Pat. Nos. 3,028,365; 4,529,791; and 4,677,162; which are hereby incorporated by reference in their entirety. Suitable aromatic polyester carbonates are described in U.S. Pat. Nos. 3,169,121; 4,156,069; and 4,260,731; which are hereby incorporated by reference in their entirety.

The production of aromatic polycarbonates is effected, for example, by the reaction of diphenols with carbonic acid halides, preferably phosgene, and/or with aromatic dicarboxylic acid dihalides, preferably benzenedicarboxylic acid dihalides, by the phase boundary method, optionally with the use of chain terminators, e.g., monophenols, and optionally with the use of trifunctional branching agents or branching agents with a functionality higher than three, for example triphenols or tetraphenols.

Diphenols for the production of the aromatic polycarbonates and/or aromatic polyester carbonates are preferably those of formula I

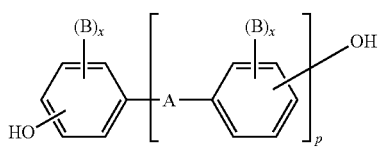

I wherein A denotes a single bond, a $C_1$-$C_5$ alkylene, a $C_2$-$C_5$ alkylidene, a $C_5$-$C_6$ cycloalkylidene, —O—, —SO—, —CO—, —S—, —$SO_2$—, or a $C_6$-$C_{12}$ arylene, on to which other aromatic rings, which optionally contain hetero atoms, can be condensed, or a radical of formula II or III

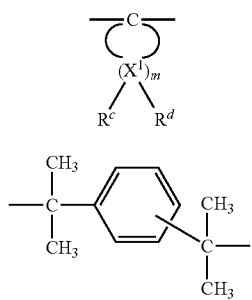

II

III

B in each case is independently hydrogen, a $C_1$-$C_{12}$ alkyl, preferably methyl, or a halogen, preferably chlorine and/or bromine;
x in each case is mutually independently 0, 1, or 2;
p is 0 or 1;
$R^c$ and $R^d$ are mutually independent of each other and are individually selectable for each $X^1$ and are hydrogen or a $C_1$-$C_6$ alkyl, preferably hydrogen, methyl or ethyl;
$X^1$ denotes carbon; and
m denotes an integer from 4 to 7, preferably 4 or 5, with the proviso that $R^c$ and
$R^d$ simultaneously denotes an alkyl on at least one $X_1$ atom.
The preferred diphenols are hydroquinone, resorcinol, dihydroxybiphenyls, bis(hydroxyphenyl)-$C_1$-$C_5$ alkanes, bis(hydroxyphenyl)-$C_5$-$C_6$ cycloalkanes, bis(hydroxyphenyl) ethers, bis(hydroxyphenyl)sulfoxides, bis(hydroxyphenyl) ketones, bis(hydroxyphenyl)sulfones and α,α'-bis (hydroxyphenyl)diisopropylbenzenes, as well as derivatives thereof which have brominated and/or chlorinated nuclei.

Diphenols which are particularly preferred are 4,4'-dihydroxybiphenyl, bisphenol A, 2,4-bis(4-hydroxyphenyl)-2-methylbutane, 1,1-bis(4-hydroxyphenyl)-cyclohexane, 1,1-bis(4-hydroxyphenyl)-3,3,5-trimethylcyclohexane, 4,4-dihydroxydiphenyl sulfide and 4,4-dihydroxydiphenyl sulfone, as well as di- and tetrabrominated or chlorinated derivatives thereof, such as 2,2-bis(3-chloro-4-hydroxyphenyl)propane, 2,2-bis-(3,5-dichloro-4-hydroxyphenyl)propane or 2,2-bis(3,5-dibromo-4-hydroxyphenyl)propane. 2,2-bis-(4-hydroxyphenyl)propane (bisphenol A) is particularly preferred. The diphenols can be used individually or as arbitrary mixtures. The diphenols are known from the literature or can be obtained by methods known from the literature.

Examples of suitable chain terminators for the production of the aromatic polycarbonates include phenol, p-chlorophenol, p-tert-butylphenol or 2,4,6-tribromophenol, as well as long chain alkylphenols such as 4-(1,3-dimethyl-butyl)-phenol or monoalkylphenols or dialkylphenols which contain a total of 8 to 20 C atoms in their alkyl substituents, such as 3,5-di-tert-butyl-phenol, p-iso-octylphenol, p-tert-octylphenol, p-dodecylphenol, 2-(3,5-dimethylheptyl)-phenol and 4-(3,5-dimethylheptyl)-phenol. The amount of chain terminators used is generally between 0.1 mole percent and 10 mole percent with respect to the molar sum of the diphenols used in each case.

The aromatic polycarbonates and/or aromatic polyester carbonates of the present invention preferably have a mean weight average molecular weights of from about 10,000 to about 200,000 preferably about 15,000 to about 80,000, more preferably about 15,000 to about 50,000. Unless otherwise indicated, the references to aromatic polycarbonate and/or aromatic polyester carbonate "molecular weight" herein refer to weight average molecular weights ($M_w$) determined by gel permeation chromatography (GPC) using laser scattering techniques with a bisphenol A polycarbonate standard and is given in units of grams per mole (g/mole).

Preferably, the melt flow rate (MFR) of the aromatic polycarbonate is from 3 to 20 grams per 10 minutes (g/10 min) as determined at 300° C. under a load of 1.2 kg.

The aromatic polycarbonates can be branched in the known manner, for example by the incorporation of 0.05 to 2.0 mole percent, with respect to the sum of the diphenols used, of trifunctional compounds or of compounds with a functionality higher than three, for example those which contain three or more phenolic groups. Branched polycarbonates suitable for the present invention can be prepared by known techniques, for example several suitable methods are disclosed in U.S. Pat. Nos. 3,028,365; 4,529,791; and 4,677,162; which are hereby incorporated by reference in their entirety.

Suitable branching agents that may be used are tri- or multi-functional carboxylic acid chlorides, such as trimeric acid trichloride, cyanuric acid trichloride, 3,3'-,4,4'-benzophenonetetracarboxylic acid tetrachloride, 1,4,5,8-naphthalene-tetracarboxylic acid tetrachloride or pyromellitic acid tetrachloride for example, in amounts of 0.01 to 1.0 mole percent (with respect to the dicarboxylic acid dichlorides used) or tri- or multi-functional phenols such as phloroglucinol, 4,6-dimethyl-2,4,6-tris(4-hydroxyphenyl)-2-heptene, 4,4-dimethyl-2,4,6-tris(4-hydroxyphenyl)heptane, 1,3,5-tris (4-hydroxyphenyl)benzene, 1,1,1-tris(4-hydroxyphenyl) ethane, tris(4-hydroxyphenyl)-phenyl-methane, 2,2-bis[4,4-bis(4-hydroxyphenyl)cyclohexyl]-propane, 2,4-bis[1-(4- hydroxyphenyl)-1-methylethyl]phenol, tetrakis(4-hydroxyphenyl)-methane, 2,6-bis(2-hydroxy-5-methyl-benzyl)-4-methyl-phenol, 2-(4-hydroxyphenyl)-2-(2,4-dihydroxyphenyl)propane, or tetrakis(4-[1-(4-hydroxyphenyl)-1-methylethyl]-phenoxy)-methane in amounts of 0.01 to 1.0 mole percent with respect to the diphenols used. Phenolic branching agents can be placed in the reaction vessel with the diphenols. Acid chloride branching agents can be introduced together with the acid chlorides.

Both homopolycarbonates and copolycarbonates are suitable. For the production of copolycarbonates according to component (i) in accordance with the invention, 1 to 25 parts by weight, preferably 2.5 to 25 parts by weight (with respect to the total amount of diphenols to be used) of polydiorganosiloxanes comprising hydroxy-aryloxy terminal groups can also be used. These are known (see, for example, U.S. Pat. No. 3,419,634) or can be produced by methods known from the literature.

Apart from bisphenol A homopolycarbonates, the preferred polycarbonates are the copolycarbonates of bisphenol A with up to 15 mole percent, with respect to the molar sums of the diphenols, of other diphenols which are cited as preferred or particularly preferred, in particular 2,2-bis(3,5-dibromo-4-hydroxyphenyl)-propane.

The preferred aromatic dicarboxylic acid dihalides for the production of the aromatic polyester carbonates are the diacid dichlorides of isophthalic acid, terephthalic acid, diphenyl ether-4,4'-dicarboxylic acid and naphthalene-2,6-dicarboxylic acid. Mixtures of the diacid dichlorides of isophthalic acid and terephthalic in a ratio between 1:20 and 20:1 are particularly preferred. A carbonic acid halide, preferably phosgene, is used in conjunction as a difunctional acid derivative during the production of the polyester carbonates.

Apart from the aforementioned monophenols, suitable chain terminators for the production of the aromatic polyester carbonates include chlorocarboxylic acid esters thereof, as well as the acid chlorides of aromatic monocarboxylic acids which may optionally be substituted by $C_1$-$C_{22}$ alkyl groups, or by halogen atoms, and also include aliphatic $C_2$-$C_{22}$ monocarboxylic acid chlorides. The amount of chain terminator is 0.1 to 10 mole percent in each case, with respect to the moles of diphenols in the case of phenolic chain terminators and with respect to the moles of dicarboxylic acid dichlorides in the case of monocarboxylic acid chloride chain terminators.

The aromatic polyester carbonates may also contain incorporated hydroxycarboxylic acids. The aromatic polyester carbonates may be either linear or may be branched. Suitable branching agents are disclosed hereinabove.

The proportion of carbonate structural units in the aromatic polyester carbonates can be arbitrarily varied. The content of carbonate groups is preferably up to 100 mole percent, particularly up to 80 mole percent, most preferably up to 50 mole percent, with respect to the sum of ester groups and carbonate groups. Both the ester and the carbonate fraction of the aromatic polyester carbonates can be present in the form of blocks, or can be randomly distributed in the condensation polymer.

The aromatic polycarbonates and aromatic polyester carbonates can be used individually or in any mixture with each other.

The thermoplastic aromatic polycarbonates and/or aromatic polyester carbonates (i) are present in an amount equal to or greater than about 5 parts by weight, preferably equal to or greater than about 15 parts by weight, preferably equal to or greater than about 25 parts by weight, and more preferably equal to or greater than about 50 parts by weight based on the total weight of the carbonate blend composition. The thermoplastic aromatic polycarbonates and/or aromatic polyester carbonates (i) are present in an amount equal to or less than about 95 parts by weight, preferably equal to or less than about 85 parts by weight, more preferably equal to or less than about 75 parts by weight, and more preferably equal to or less than about 65 parts by weight based on the weight of the carbonate blend composition. Unless stated otherwise, parts by weight are based on the total weight of the carbonate blend composition.

Component (ii) of the present invention is an aromatic polyester. Suitable aromatic polyesters used in this invention may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an—[-AABB-]—polyester. Although the presence of a catalyst such as p-toluene sulfonic acid, a titanium alkoxide or a dialkyltin oxide is helpful, the primary driving force behind the direct esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a byproduct and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). The reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium, zinc, calcium, magnesium or aluminum, whereas catalysts such as antimony oxide, titanium butoxide or sodium acetate are often used when acidolysis occurs in the interchange reaction. Diol derivatives such as an acetate can be used effectively when it is desired to conduct acidolysis.

Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chain coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produce by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

Suitable reactants for making the polyester used in this invention, other than hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions or the polymer chain can be substituted with, for example, halogens, alkoxy groups or alkyl side chains and can contain divalent heteroatomic groups (such as —O—, —S— or —SO$_2$—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2$ to $C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexane-dimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, ciphenyletherdicarboxylic acid, diphenyldicarboxylic acid, diphenylsulfonedicarboxylic acid, diphenoxyethanedicarbocylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention. For example, use of cyclohexanedimethylol together with ethylene glycol in esterification with terephthalic acid forms a clear, amorphous copolyester (PETG) of particular interest. Also contemplated are liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Preferably the aromatic polyester has a degree of crystallinity of between 25 to 60 percent.

Aromatic polyesters such as the poly(alkylene phenylene-dicarboxylates), polyethylene terephthalate (PET) and polybutylene terephthalate (PBT), or mixtures thereof, are particularly useful in this invention.

Methods and materials useful for the production of polyesters, as described above, are discussed in greater detail in U.S. Pat. Nos. 2,465,319; 3,047,539; and 3,756,986, each of which is incorporated herein by reference.

The aromatic polyester (ii) is present in an amount equal to or greater than about 5 parts by weight, preferably equal to or greater than about 10 parts by weight, preferably equal to or greater than about 15 parts by weight, preferably equal to or greater than about 20 parts by weight, preferably equal to or greater than about 25 parts by weight, and more preferably equal to or greater than about 30 parts by weight based on the total weight of the carbonate blend composition. The aromatic polyester (ii) is present in an amount equal to or less than about 95 parts by weight, preferably equal to or less than about 90 parts by weight, more preferably equal to or less than about 85 parts by weight, preferably equal to or less than about 80 parts by weight, more preferably equal to or less than about 75 parts by weight, and more preferably equal to or less than about 65 parts by weight based on the weight of the carbonate blend composition. Unless stated otherwise, parts by weight are based on the total weight of the carbonate blend composition.

Component (iii) of the present invention is a silicon-containing graft (co)polymer having a core/shell structure. It may be obtained by graft polymerizing alkyl(meth)acrylate and optionally a copolymerizable vinyl monomer onto a composite rubber core. The composite rubber core that includes interpenetrated and inseparable interpenetrating network (IPN) type polymer is characterized in that its glass transition temperature is below 0° C., preferably below −20° C., especially below −40° C. Silicon-based graft (co)polymers are well known, for example see US Publication Numbers 2008/0090961 and 2007/0155857, which are incorporated herein in their entirety.

In one embodiment, the silicon-containing graft (co)polymer comprises a core-shell morphology, including a shell that contains polymerized alkyl(meth)acrylate and glycidyl (meth)acrylate grafted to a composite rubber core that contains polyorganosiloxane and poly(meth)alkyl acrylate components, wherein said shell comprises at least 1 to 20 percent by weight glycidyl (meth)acrylate and at least 99 to 80 percent by weight alkyl(meth)acrylate, weight percents based on the weight of the graft shell and the core comprises at least 5 to 85 percent by weight silicon, preferably 5 to 25 percent, and more preferably 5 to 15 percent by weight based on the total weight of the silicon-containing graft (co)polymer. The shell is a rigid phase, preferably copolymerized of glycidyl methacrylate and methylmethacrylate.

The level of silicon (in percent) is determined by wavelength dispersive x-ray fluorescence (WDXRF) spectrometry. WDXRF is a non-destructive analytical technique used to determine elemental composition (atomic number ≥5) of substances (liquid, solid) at concentrations ranging from parts per million (ppm) to 100 percent. These substances may be organic and/or inorganic and they may be either a liquid or a solid. XRF can be used for qualitative, semi-quantitative, and quantitative determinations.

Samples are excited with x-rays, resulting in the ejection of inner shell electrons from the sample atoms. This is followed by the transition of outer shell electrons to fill the vacancies created by the ejected electrons. These transitions result in the emission of x-ray photons whose energy is equal to the difference in binding energies of the two electron shells involved in the transition processes. A wavelength dispersive spectrometer is used to separate the x-ray emission on the basis of wavelength according to Bragg's Law. The wavelengths of these emitted x-ray photons are characteristic of the elements from which they were emitted. After applied appropriate matrix correction based upon the sample's composition, the intensity of the emitted x-ray is proportional to the concentration of the element in the sample.

In another embodiment, the silicon-containing graft (co)polymer comprises a core of polysiloxane-alkyl(meth)acrylate, sometimes referred to as an interpenetrating network (IPN) type polymer, which contains polysiloxane and butylacrylate. The shell is a rigid phase, preferably polymerized of methylmethacrylate. The weight ratio of polysiloxane/alkyl (meth)acrylate/shell is 70-90/5-15/5-15, preferably 75-85/7-12/7-12, most preferably 80/10/10.

The rubber core has median particle size ($d_{50}$ value) of 0.05 to 5, preferably 0.1 to 2 microns, especially 0.1 to 1 micron. The median value may be determined by ultracentrifuge measurement (W. Scholtan, H. Lange, Kolloid, Z. and Z. Polymere 250 (1972), 782-1796).

The polyorganosiloxane component in the silicone acrylate composite rubber may be prepared by reacting an organosiloxane and a multifunctional crosslinker in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclo-hexasiloxane, trimethyltriphenylcyclotrisiloxane, tetramethyltetraphenylcyclotetrasiloxane, octaphenylcyclotetrasiloxane, which may be used alone or in a mixture of two or more such compounds. The organosiloxane component is present in the silicone acrylate rubber in an amount of at least 70 percent, preferably at least 75 percent, based on weight of the silicone acrylate rubber.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

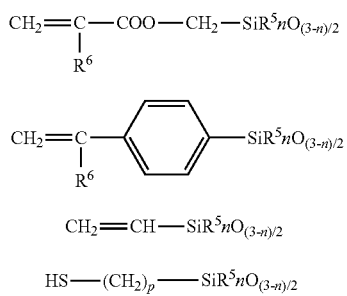

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (IV). Preferred (meth)acryloyloxysilanes include β-methacryloyloxyethyl-dimethoxy-methyl-silane, γ-methacryloyl-oxy-propylmethoxy-dimethyl-silane, γ-ethacryloyloxypropyl-dimethoxy-methyl-silane, γ-methacryloyloxypropyl-trimethoxy-silane, γ-methacryloyloxy-propyl-ethoxy-diethyl-silane, γ-methacryloyloxypropyl-diethoxy-methyl-silane, γ-ethacryloyloxy-butyl-diethoxy-methyl-silane.

Vinylsiloxanes, especially tetramethyl-tetravinyl-cyclotetrasiloxane, are suitable for forming the structure V.

p-Vinylphenyl-dimethoxy-methylsilane, for example, is suitable for forming structure VI. γ-Mercaptopropyldimethoxy-methylsilane, γ-mercaptopropylmethoxy-dimethylsilane, γ-mercaptopropyl-diethoxymethylsilane, etc. are suitable for forming structure (VII).

The amount of these compounds is from up to 10 percent, preferably 0.5 to 5.0 percent (based on the weight of polyorganosiloxane).

The acrylate component in the silicone acrylate composite rubber may be prepared from alkyl (meth)acrylates, crosslinkers and graft-active monomer units.

Examples of preferred alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20 percent, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference in their entirety.

The graft polymerization onto the graft base (herein iii.a) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (iii.b) is formed of a mixture of:
(iii.b.1) a first component comprising from 1 to 20 percent, preferably 1 to 15 percent, especially 5 to 15 percent (based on the weight of the graft shell), of at least one monomer selected from the group of vinyl aromatic compounds or ring-substituted vinyl aromatic compounds (e.g. styrene, α-methylstyrene, p-methylstyrene), vinyl cyanides (e.g. acrylonitrile and methacrylonitrile), and glycidyl(meth)acrylate, and
(iii.b.2) a second component comprising from 99 to 80 percent, preferably 99 to 85 percent, especially 95 to 85 percent (based on the weight of the graft shell) of at least one monomer selected from the group consisting of (meth)acrylic acid ($C_1$-$C_8$)-alkyl esters (e.g., methyl methacrylate, n-butyl acrylate, t-butyl acrylate) and derivatives (e.g., anhydrides and imides) of unsaturated carboxylic acids (e.g., maleic anhydride and N-phenyl maleimide).

Preferably, components (iii.b.1) and (iii.b.2) are present as in the shell as a (co)polymer either as an interpenetrating network (IPN) type polymer or preferably copolymerized together.

The preferred graft shell includes one or more (meth) acrylic acid ($C_1$-$C_8$)-alkyl esters, especially methyl methacrylate copolymerized with glycidyl(meth)acrylate.

A particularly suitable graft copolymers is available from Mitsubishi Rayon Co., Ltd. as METABLEN™ SX-S2200.

The silicon-containing graft copolymer of the present invention is present in an amount of from equal to or greater than 0.5 parts by weight, preferably equal to or greater than 1 part by weight, preferably equal to or greater than 2 parts, preferably equal to or greater than 3 parts, and more preferably equal to or greater than 5 parts by weight based on the weight of the carbonate blend composition. The silicon-containing graft copolymer of the present invention is present in an amount of from equal to or less than 25 parts by weight, preferably equal to or less than 20 parts, preferably equal to or less than 15 parts, preferably equal to or less than 12 parts, and more preferably equal to or less than 10 parts by weight based on the weight of the carbonate blend composition.

It has subsequently been found that in the case of the carbonate blend composition according to the present invention, it is preferable that most of the silicon-containing graft copolymer is located in the aromatic polyester phase, preferably at least 90 percent is located in the aromatic polyester phase, and in a preferred embodiment, the polycarbonate phase contains no silicon-containing grafted copolymer component at all, in order to obtain the improved combinations of impact and ESCR properties.

If desired to further improve the notch sensitivity and/or low temperature impact resistance, it is possible to use as component (iv) a non-glycidyl(meth)acrylate-containing graft copolymer impact modifier component selected such that it will locate in the polycarbonate phase. Preferably the non-glycidyl(meth)acrylate-containing graft copolymer impact modifier will locate primarily in the carbonate polymer component, most preferably only in the polycarbonate phase. If a non-glycidyl(meth)acrylate-containing graft copolymer impact modifier component is employed, it is preferably one or more of the various known types of rubber materials and preferably does not contain a silicon rubber.

In general, such rubber materials have elastic properties and have glass transition temperatures (Tg's) less than 0° C., generally less than –10° C., preferably less than –20° C., and more preferably less than –30° C. Suitable rubbers include the well known homopolymers and copolymers of conjugated dienes, particularly butadiene; as well as other rubbery polymers such as olefin polymers, particularly copolymers of ethylene, propylene and optionally a nonconjugated diene; or acrylate rubbers, particularly homopolymers and copolymers of alkyl acrylates having from 4 to 6 carbons in the alkyl group. In addition, mixtures of the foregoing rubbery polymers may be employed if desired. Preferred rubbers are homopolymers of butadiene and copolymers thereof with up to about 30 percent by weight styrene. Such copolymers may be random or block copolymers and in addition may be hydrogenated to remove residual unsaturation. Also preferred are rubbery polymers prepared from mono-olefins with optional nonconjugated diene monomers due to their resistance to weathering as compared to conjugated diene rubbers.

Where incorporated, the rubbers are preferably grafted with an amount of a graft polymer or selected based on their composition such that they will be located in the carbonate polymer phase. As taught in U.S. Pat. No. 5,087,663, the selection of comonomer type and amount for the monovinylidene aromatic copolymer and grafted rubber composition helps determine whether a selected grafted rubber component will locate in the carbonate polymer phase and/or at the interface of the two phases during the melt mixing of the components.

If used, a non-glycidyl(meth)acrylate-containing grafted copolymer (iv) may be present in an amount equal to or greater than 2 parts by weight, preferably equal to or greater than 3 parts by weight, and more preferably equal to or greater than 4 parts by weight based on the weight of the carbonate blend composition. If used, the non-glycidyl(meth)acrylate-containing graft copolymer (iv) is present in an amount of from equal to or less than 25 parts by weight, preferably equal to or less than 15 parts by weight, and more preferably equal to or less than 10 parts by weight based on the weight of the carbonate blend composition.

As used herein, the terms "located in the aromatic polyester polymer phase" and "not located in the polycarbonate phase" mean that when the polymer blend is examined, most suitably by Atomic Force Microscopy imaging, the dispersed particles or domains of silicon-containing graft copolymer are completely or mostly surrounded by aromatic polyester polymer. Although some of the rubber particles or domains may be at or very near the interface of the carbonate polymer phase and aromatic polyester phases, and possibly contacting the polycarbonate phase, the benefits of the present invention are obtained where the major portion, preferably all, of any silicon-containing graft copolymer volume is located in the aromatic polyester phase.

The carbonate blend composition of the present invention contains as component (v) at least one or more of an additive commonly used in carbonate blend compositions. For example, one such additive is one or more flame retardant additive, such as a phosphorous containing compound, preferably an oligomeric phosphate such as bisphenol-A bis (diphenyl phosphate) (BAPP), a halogenated compound, poly(block-phosphonato-ester), poly(block-phosphonato-carbonate), for example see U.S. Pat. No. 7,645,850 which is incorporated in its entirety, such flame retardant additives typically are present in an amount of from 1 to 20 percent by weight based on the total weight of the carbonate composition. The carbonate composition of the present invention may also contain charring agents, such as metal salts, and/or anti drip agents such as a polytetrafluoroethylene polymer (TEFLON) and/or a fluorothermoplast, alone or in combinations, charring agents and anti drip agents are usually present in an amount of from 100 to 10,000 parts per million (PPM) based on the total weight of the carbonate composition.

Further, the carbonate composition of the present invention may comprise one or more additive typically used in carbonate compositions (v), such as a lubricant, for example mineral oil, epoxidized soybean oil, or the like; a mold release agent, such as pentaerythritol tetrastearate; a nucleating agent; an anti-static agent; a stabilizer; a filler and/or a reinforcing material such as glass fibers, carbon fibers, metal fibers, metal coated fibers, thermoset fibers, glass beads, mica, silicates, quartz, talc, titanium dioxide, and/or wollastonite alone or in combinations; a dye; or a pigment. One such stabilizer is present to minimize ester-carbonate interchange. Such stabilizers are known in the art, for example see U.S. Pat. Nos. 5,922,816; 4,532,290; 4,401,804, all of which are incorporated herein by reference, and may comprise certain phosphorous containing compounds that include phosphoric acid, certain organic phosphorous compounds such as distearyl pentaerythritol diphosphate, mono or dihydrogen phosphate, or mono-, di-, or trihydrogen phosphate compounds, phosphate compounds, and certain inorganic phosphorous compounds such as monosodium phosphate and monopotassium phosphate, silyl phosphates, and silyl phosphate derivatives, alone or in combination and present in an amount effective to inhibit ester-carbonate interchange in the composition.

If present, the filler and/or reinforcing material is present in an amount equal to or greater than about 0.5 parts by weight, preferably equal to or greater than about 1 part by weight, more preferably equal to or greater than about 2 parts by weight, more preferably equal to or greater than about 5 parts by weight, and more preferably equal to or greater than about 10 parts by weight based on the weight of the carbonate blend composition. If present, the filler and/or reinforcing material is present in an amount equal to or less than about 60 parts by weight, preferably equal to or less than about 40 parts by weight, more preferably equal to or less than about 30 parts by weight, more preferably equal to or less than about 25 parts by weight, and more preferably equal to or less than about 20 parts by weight based on the weight of the carbonate blend composition.

The carbonate blend compositions comprising components (i), (ii), (iii), (iv), and (v) are produced by mixing the particular components in a known manner and melt-compounding and/or melt-extruding them at temperatures of from 200° C. to 300° C. in conventional units such as internal kneaders, extruders and twin-screw extruders. Preferably, the extruder is operated to maintain the blend crystallinity at least 9 percent as measured by DSC.

The individual components may be mixed in a known manner both in succession and simultaneously and both at approximately 23° C. (room temperature) and at a higher temperature.

The present invention accordingly also provides a process for the production of the carbonate blend compositions.

By virtue of their excellent ESCR performance, good mechanical properties, in particular impact resistance and elevated heat resistance, the carbonate blend compositions according to the invention are suitable for the production of fabricated articles of any kind, in particular those subject to stringent requirements with regard to mechanical properties and especially requiring good impact resistance and solvent resistance.

The carbonate blend compositions of the present invention are thermoplastic. When softened or melted by the application of heat, the carbonate blend compositions of this invention can be formed or molded into fabricated articles using conventional techniques such as compression molding, injection molding, gas assisted injection molding, calendaring, vacuum forming, thermoforming, extrusion and/or blow molding, alone or in combination. The ignition resistant polymer compositions can also be fabricated, formed, spun, or drawn into films, fibers, multi-layer laminates or extruded into sheets and/or profiles. Examples of fabricated articles which may be produced are: medical devices of all kinds, enclosures of all kinds, for example for domestic appliances such as juice extractors, coffee machines, food mixers, for office equipment, such as monitors, printers, copiers or cladding sheet for the building sector and automotive components. They may also be used in electrical engineering applications as they have suitable electrical properties.

The carbonate blend compositions according to the invention may furthermore, for example, be used to produce the following fabricated articles or shaped articles: medical applications such as connectors, valves, surgical instruments, trays, lab ware, diagnostics, drug delivery housings, external defibrillators, patient monitoring devices, medical imaging devices, diagnostic equipments, respiratory housings, hospital bed frames and components, interior trim for rail vehicles, interior and exterior automotive applications, enclosures for electrical devices containing small transformers, enclosures for information dissemination and transmission devices, enclosures and cladding for medical purposes, massage devices and enclosures therefore, toy vehicles for children, sheet wall elements, enclosures for safety equipment, hatchback spoilers, thermally insulated transport containers, apparatus for keeping or caring for small animals, articles for sanitary and bathroom installations, cover grilles for ventilation openings, articles for summer houses and sheds, and enclosures for garden appliances. Preferred fabricated articles include housings or enclosures such as for: power tools, appliances, consumer electronic equipment such as TVs, VCRs, DVD players, web appliances, electronic books, etc., or housings or enclosures such as for: information technology equipment such as telephones, computers, monitors, fax machines, battery chargers, scanners, copiers, printers, hand held computers, flat screen displays, etc.

The present invention accordingly also provides the use of the carbonate blend compositions according to the invention for the production of fabricated articles of all kinds, preferably those stated above, and the articles made from the carbonate blend compositions according to the invention.

EXAMPLES

Examples 1 and 2 and Comparative Example C are prepared by compounding pre-determined amounts of polycarbonate, polyester, silicon-containing graft copolymer, and other components in a Leistritz 18 millimeter (mm) twin screw extruder controlled by Haake software. The extrude has five heated zones, a feed zone, and a 3 mm strand die. Prior to compounding the polycarbonate and the polyesters resins are dried in a vacuum oven for at least five hours to minimize their hydrolysis during processing; the polycarbonate is dried at 120° C. and the polyesters at 150° C. The components are dry blended and fed to the extruder through a twin auger K-Tron feeder. The hopper of the feeder is padded with nitrogen and the feed cone to the extruder is sealed with foil to minimize air intrusion which can cause oxidative degradation of the polymers. The extrusion temperature was set to 275° C. The resulting strand is water quenched, dried with an air knife, and pelletized with a Conair chopper.

Pellets of Examples 1 and 2 and Comparative Examples A to C are injection molded into ASTM Type-I tensile bars on an Arburg 370C-80 ton injection molder. Prior to molding, the pellets are dried in a vacuum oven at 120° C. for at least five hours. The melt temperature is set to 265° C. and mold the mold temperatures is set to and 80° C. The cycle time was kept constant at approximately 2 minutes.

The composition for Examples 1 and 2 and Comparative Examples A to C are given in Table 1, amounts are in parts by weight based on the total weight of the composition. In Table 1:

"PC" is a linear bisphenol A polycarbonate resin having a weight average molecular weight of 27700 g/mol, available as CALIBRE™ 200-10 from. The Dow Chemical Company;

"PET" is a polyethylene terephthalate having 0.95 dl/g intrinsic viscosity, available as TRAYTUF™ 9506 polyester from M&G Polymers;

"PBT" is a polybutylene terephthalate having melt flow rate of 20 g/10 min, available as CELANEX™ 2002 polyester from Ticona Polymers;

"Si-Rubber-1" is a core-shell silicon-containing graft copolymer having polydimethylsiloxane core ($T_g$=−120° C.) and poly(methyl methacrylate) shell ($T_g$=95° C.), available as METABLEN™ SX005 from Mitsubishi Rayon. The core/shell weight ratio is approximately 80/20;

"Si-Rubber-2" is a core-shell silicon-containing graft copolymer having polydimethylsiloxane core ($T_g=-120°$ C.) and poly(methyl methacrylate-co-glycidyl methacrylate) shell ($T_g=95°$ C.), available as METABLEN™ S2200 from Mitsubishi Rayon. The core/shell weight ratio is approximately 10/90 and the weight percent of glycidyl(meth)acrylate in the shell is about 5 percent;

"IRGANOX" is a phenolic antioxidant, available as IRGANOX™ 1076 from BASF;

"Mineral Oil" is mineral oil obtained as a hydrotreated heavy paraffinic distillate available as PARALUX™ 6001R from Chevron Products Company;

"PC/PBT" is a polycarbonate and polybutylene terephthalate blend available as VALOX™ 364 from SABIC Innovative Plastics; and "PC/PET" is a polycarbonate and polyethylene terephthalate blend, available as MAKROBLEND™ UT 1018 from Bayer MaterialScience.

Property performance for Examples 1 and 2 and Comparative Examples A to C are reported in Table 1. In Table 1:

"Izod" notched impact resistance is determined on the molded ASTM Type-I tensile bars and is performed at room temperature on according to the ASTM D 256 and values reported in foot pound per inch (ft-lb/in);

"Tensile" yield, break, and modulus properties are determined on the molded ASTM Type-I tensile bars and is performed at room temperature on INSTRON™ 5565 instrument according to the ASTM D 638 and values reported in mega Pascals (MPa); and "DTUL" is deflection temperature under load and is measured according to ASTM D 648 using 0.125 inch thick bar with an applied load of 66 pounds per square inch (psi).

TABLE 1

|  | Example | | Comparative Example | | |
| --- | --- | --- | --- | --- | --- |
|  | 1 | 2 | A | B | C |
| Composition | | | | | |
| PC | 54.7 | 34.7 | | | 54.7 |
| PET | 35 | | | | 35 |
| PBT | | 55 | | | |
| PC/PBT | | | 100 | | |
| PC/PET | | | | 100 | |
| Si-Rubber-1 | | | | | 10 |
| Si-Rubber-2 | 10 | 10 | | | |
| IRGANOX | 0.2 | 0.2 | | | 0.2 |
| Mineral Oil | 0.1 | 0.1 | | | 0.1 |
| Properties | | | | | |
| Izod, ft-lb/in | 14.4 | 15.8 | 12.1 | 14 | 11.5 |
| Tensile Properties | | | | | |
| Yield | 54 | 51 | 47 | 50 | 52 |
| Break | 58 | 38 | 39 | 47 | 47 |
| Modulus | 1643 | 1677 | 1562 | 1711 | 1661 |
| DTUL | 119 | 108 | 103 | 115 | |

"Chemical Resistance" testing is performed according to ASTM D 543-06 with the ASTM Type-I tensile bars. The bars are first strained by bending over a polished stainless steel slab roughly at their middle section and clamping the ends. Three different levels of strains were applied: 0.5%, 1.0% and 1.5%; the strain level is controlled by varying the height of the steel slab. The strained bars are then exposed to chemicals by placing a cotton pad on the middle section and soaking the pad with approximately 5 milliliter (ml) of the solution to be tested. Thereafter, the bars are kept covered to minimize the evaporation of the solution. The chemical exposure is continued for three days. Every 24 hours, the cotton pads are changed and soaked with fresh chemical. At the end of three days the cotton pads are removed and the bars were gently wiped with paper towels to remove any residual chemical on the surface. Three bars are tested for each solvent at a given strain. Tensile testing is performed on the bars according to the ASTM D 638 method herein above. The average break stress ("$\sigma_{chemical}$") and break strain ("$\epsilon_{chemical}$") values for the three bars are calculated and listed in Table 3 and Table 4, respectively. The same tensile test is performed on 3 to 5 bars that are not exposed to any chemical to measure the actual break strain ("$\sigma_{no\ chemical}$") and break stress ("$\epsilon_{no\ chemical}$") of the material. The chemical resistance for a material with the chemical is rated according to the $\sigma_{chemical}/\sigma_{no\ chemical}$ and $\epsilon_{chemical}/\epsilon_{no\ chemical\ chemical}$ ratios as follows in Table 2:

TABLE 2

| Rating | Chemical Resistance | $\sigma_{chemical}/\sigma_{no\ chemical}$ | $\epsilon_{chemical}/\epsilon_{no\ chemical}$ |
| --- | --- | --- | --- |
| + | good | ≥90% | 80-139% |
| o | marginal | 80-89% | 65-79% |
| -- | poor | ≤79% | ≤64% or ≥140% |

Chemical resistance performance versus stress and strain properties for Examples 1 and 2 and Comparative Examples A to C are reported in Table 3 (Break Stress Performance) and Table 4 (Break Strain Performance). In Tables 3 and 4:

"Bleach" is a 50/50 (v/v) mixture of CLOROX™ household bleach and deionized water, "CIDEX" is a 3.4 weight percent solution of glutaraldehyde in water used for disinfection or sterilization for a wide range of materials and medical instruments available as CIDEXPLUS™ from Johnson and Johnson;

"Ethanol" is a 70/30 (v/v) solution of 200 proof ethanol (available for example from Acros Organics) and deionized water;

"WEXCIDE" is a 6.43 weight percent solution of organic phenols in water is a disinfectant and deodorizer for decontamination of hard non-porous surfaces that have the potential to be contaminated by blood or other potentially infectious material (OM) available as WEX-CIDE 128 from Wexford Labs. It is used after diluting 128 times in deionized water; and "VIREX" is a 16.894 weight percent solution of quaternary germicides in water, is a one-step quaternary disinfectant cleaner and deodorant to clean and disinfect hard surfaces in hospitals and is available as VIREX™ II 256 from Johnson Diversey. It is used after diluting 256 times in deionized water.

TABLE 3

|  | Example | | Comparative Example | | |
| --- | --- | --- | --- | --- | --- |
|  | 1 | 2 | A | B | C |
| Chemical Resistance Bleach | | | | | |
| 0.5% | + | + | + | + | + |
| 1.0% | + | + | + | + | + |
| 1.5% | + | + | + | + | + |
| CIDEX | | | | | |
| 0.5% | + | + | + | + | + |
| 1.0% | + | + | + | + | + |
| 1.5% | + | + | + | -- | -- |

TABLE 3-continued

|  | Example | | Comparative Example | | |
|---|---|---|---|---|---|
|  | 1 | 2 | A | B | C |
| Ethanol |  |  |  |  |  |
| 0.5% | + | + | + | + | + |
| 1.0% | + | + | + | + | + |
| 1.5% | + | + | + | + | ○ |
| VIREX |  |  |  |  |  |
| 0.5% | + | + | + | + | + |
| 1.0% | + | + | + | + | + |
| 1.5% | + | + | + | + | -- |
| WEXCIDE |  |  |  |  |  |
| 0.5% | + | + | + | + | + |
| 1.0% | + | + | + | + | + |
| 1.5% | + | + | + | ○ | -- |

TABLE 4

|  | Example | | Comparative Example | | |
|---|---|---|---|---|---|
|  | 1 | 2 | A | B | C |
| Chemical Resistance Bleach |  |  |  |  |  |
| 0.5% | + | + | + | + | + |
| 1.0% | + | + | + | + | + |
| 1.5% | + | + | -- | + | + |
| CIDEX |  |  |  |  |  |
| 0.5% | + | + | + | + | + |
| 1.0% | + | + | + | + | + |
| 1.5% | + | + | ○ | ○ | -- |
| Ethanol |  |  |  |  |  |
| 0.5% | + | + | + | + | + |
| 1.0% | + | + | + | + | + |
| 1.5% | + | + | -- | -- | ○ |
| VIREX |  |  |  |  |  |
| 0.5% | + | + | + | + | + |
| 1.0% | + | + | + | + | + |
| 1.5% | + | + | -- | ○ | -- |
| WEXCIDE |  |  |  |  |  |
| 0.5% | + | + | -- | + | + |
| 1.0% | + | + | + | + | + |
| 1.5% | + | + | -- | ○ | -- |

"Atomic Force Microscopy" is used to determine the morphology of the blends. A piece from the center core of the bulk of the tensile bars was microtome polished under cryogenic conditions of −120° C. using a Leica UTC/FCS microtome. Polishing is performed using diamond knives. The polished specimens are scanned with a Digital Instruments Dimension 3100 atomic force microscope (AFM) in Tapping Mode with phase detection (software version 5.30.3sr3). MicroMasch tips (tip length=235 micrometers (μm), tip radius=5-10 nanometers (nm), spring constant=37-55 Newton per meter (N/m), and frequency=159-164 kilo Hertz (kHz) are used for all experiments. The tapping ratio is set to 0.75 and the free amplitude set-point voltage to 5V. Post processing of images is conducted with Adobe Photoshop v9 software. Copies of micrographs of Examples 1 and 2 and Comparative Example A to C are shown in FIG. 1, FIG. 2, FIG. 3, FIG. 4, and FIG. 5, respectively.

The silicon-containing graft copolymer (or core-shell rubber) is significantly softer than the polycarbonate/polyester matrix and is clearly distinguishable as the darker domains in these images; a core-shell rubber domain is identified in FIG. 1 with an "A". The main feature that distinguishes polyester phases form the polycarbonate phases is that the polyester phase appears to be "grainy" or "coarse" as opposed to the "smooth" polycarbonate phase. A polyester domain is marked with a "B" and a polycarbonate domain is marked with a "C" in FIG. 1.

Figure 4:
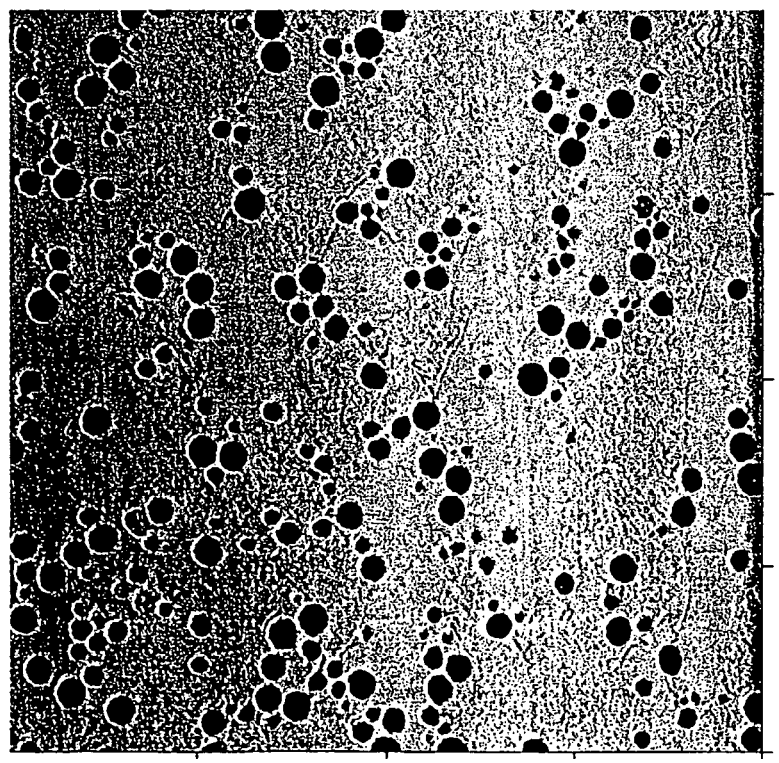
FIG. 4 is a copy of an AFM image showing the morphology of a second carbonate blend composition that is not an example of the present invention.
Figure 5:
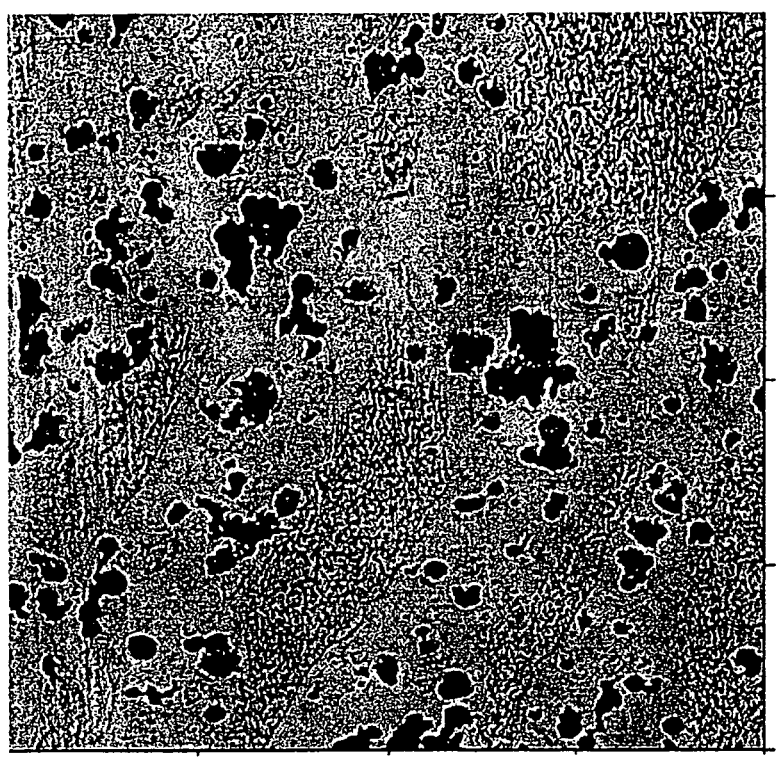
FIG. 5 is a copy of an AFM image showing the morphology of a third carbonate blend composition that is not an example of the present invention.

It is clear from these images that in existing polycarbonate/polyester/core-shell rubber formulations the core-shell rubber resides preferentially in the polycarbonate phase (Comparative Example A, FIG. 3 and FIG. 5) and/or at the interface between the polycarbonate and polyester phases (Comparative Example 2, FIG. 4). However, in the compositions of the present invention, Example 1 and 2, (FIG. 1 and FIG. 2, respectively) the silicon-containing graft copolymer is present almost exclusively in the polyester phase. Not to be held to a particular theory, but we believe that it is the glycidyl methacrylate functionality in the shell which dictates the location of the silicon-containing graft copolymer in the polyester phase. This theory is supported by comparing the morphologies of Example 1 (FIG. 1) and Comparative Example C (FIG. 5).

Comparative Example C has the same composition as Example 1 and also uses a silicon-containing graft copolymer having a polydimethylsiloxane core and poly(methy)methacrylate shell. The only difference between Example 1 and Comparative Example C is that the shell of the silicon-containing grafted copolymer used in Comparative Example C does not contain any glycidyl methacrylate. As can be seen from FIG. 5, in the absence of the glycidyl methacrylate in the shell the silicon-containing grafted copolymer, it resides almost exclusively in the polycarbonate phase losing its selectivity towards the polyester phase.

It was unexpected and surprising to find that preferentially locating the silicon-containing grafted copolymer in the compositions of the present invention in the polyester phase resulted in as good or better blend of impact, tensile and heat performance properties of the carbonate blends of the invention as compared to the prior art. Even more surprising is that the carbonate blend compositions of the present invention offer significantly better resistance to cleaning and disinfecting agents than the comparative examples. Example 1 and Example 2 remain resistant to all the cleaning and disinfecting agents. However, the Comparative Examples exhibits marginal or poor resistance with some or all of the cleaning and disinfecting agents.

It can be seen that, the carbonate blends of the present invention exhibit improved chemical resistance against common cleaning and disinfecting agents used for sanitizing medical devices while affording better or comparable impact, tensile, and heat performance properties.

The invention claimed is:

1. A carbonate blend composition comprising:
   (i) an aromatic polycarbonate or an aromatic polyester carbonate having a melt flow rate of from 3 to 20 g/10 min determined at 300° C. and a load of 1.2 kg present in an amount of from 5 parts to 65 parts;
   (ii) an aromatic polyester- having a degree of crystallinity of from 25 to 60 percent present in an amount of greater than 30 parts to 95 parts; and
   (iii) a silicon-containing graft (co)polymer having a core-shell morphology, comprising:
      (iii.a) a composite rubber core that contains polyorganosiloxane and poly(meth)alkyl acrylate components, and
      (iii.b) a grafted shell that comprises (co)polymerized glycidyl(meth)acrylate and alkyl(meth)acrylate components present in an amount of from 0.5 to 25 parts, wherein the composition has a polycarbonate or aromatic polyester carbonate phase and an aromatic polyester phase wherein at least 90 percent of the silicon-containing graft (co)polymer having a core-shell morphology is present in the aromatic polyester phase and has a crystallinity of at least 9 percent; and exhibits good chemical resistance to one or more of bleach, ethanol, 3.4 weight percent glutaraldehyde in water, 6.43 weight percent of organic phenols in water or about 17 percent of quaternary germicides in water according to ASTM D 543-06 such that the ratio of break stress of chemically exposed samples to non exposed samples is greater than or equal to 90 percent and the ratio of break strain of chemically exposed samples to non exposed samples is from 80 to 139 percent, and parts are by weight based to the weight of the carbonate blend composition.

2. The carbonate blend composition of claim 1 further comprising:
 (iv) one or more of a non-glycidyl(meth)acrylate-containing graft copolymer, and
 (v) one or more of a flame retardant, a charring agent, an anti drip agent, a filler, a reinforcing material, a stabilizer, a pigment, a dye, a mold release, a lubricant, or an anti-static agent.

3. The carbonate blend composition of claim 1 wherein:
 (i) the aromatic polycarbonate or an aromatic polyester carbonate is present in an amount of from 5 parts to 95 parts;
 (ii) the aromatic polyester is present in an amount of from 5 parts to 95 parts; and
 (iii) the silicon-containing graft (co)polymer is present in an amount of from 0.5 to 25 parts,
 wherein parts are by weight based to the weight of the carbonate blend composition.

4. The carbonate blend composition of claim 1 wherein the graft shell (iii.b) comprises:
 (iii.b.1) from 1 to 20 percent by weight of glycidyl(meth)acryltate and
 (iii.b.2) from 99 to 80 percent by weight of methyl methacrylate.

5. The carbonate blend composition of claim 1 wherein the aromatic polyester is polyethylene terephthalate (PET) and the aromatic polycarbonate or the aromatic polyester carbonate is prepared from 2,2-bis-(4-hydroxyphenyl)propane.

6. The carbonate blend composition of claim 1 wherein the aromatic polyester is polybutylene terephthalate (PBT) and the aromatic polycarbonate or the aromatic polyester carbonate is prepared from 2,2-bis-(4-hydroxyphenyi) propane.

7. The carbonate blend composition of claim 1 further comprising:
 (v) from 1 to 20 percent by weight based on the total weight of the carbonate blend composition of one or more flame retardant additives selected from a phosphorous containing compound, an oligomeric phosphate, a halogenated compound, a poly(block-phosphonato-ester), a poly(block-phosphonato-carbonate), or combinations thereof.

8. The carbonate blend composition of claim 1 further comprising:
 (v) from 100 to 10,000 ppm based on the total weight of the carbonate blend composition of one or more of a charring agent. an anti drip agent, or combinations thereof.

9. A molded article comprising the carbonate blend composition of claim 1.

10. The molded article of claim 9 wherein said article is a medical device.

11. The carbonate blend composition of claim 1 further comprising: (iv) one or more of a non-glycidyl(meth)acrylate-containing graft copolymer.

12. The carbonate blend composition of claim 1 further comprising (v) one or more of a flame retardant, a charring agent, an anti drip agent, a filler, a reinforcing material, a stabilizer, a pigment, a dye, a mold release, a lubricant, or an anti-static agent.

13. The carbonate blend composition of claim 1 having a polycarbonate or aromatic polyester carbonate phase and an aromatic polyester phase wherein none of the silicon containing graft (co)polymer having a core-shell morphology is present in the polycarbonate or aromatic polyester carbonate phase.

14. The carbonate blend composition according to claim 12 wherein the flame retardant is a haiogenated compound.

15. The carbonate blend composition of claim 1 wherein the aromatic polycarbonate and/or aromatic polyester carbonate are based on diphenols selected from the group of are hydroquinone, resorcinol, dihydroxybiphenyls, bis(hydroxyphenyl)-C1-C5 alkanes, bis(hydroxyphenyl)-C5-C6 cycloalkanes, bis(hydroxyphenyl)ethers, bis(hydroxyphenyl)sulfoxides, bis(hydroxyphenyl)ketones, bis(hydroxyphenyl)sulfones and α, α'-bis(hydroxyphenyl)diisopropylbenzenes, which may have brominated and/or chlorinated nuclei.

16. The carbonate blend composition of claim 1 wherein the aromatic polycarbonate and/or aromatic polyester carbonate exhibit a mean weight average molecular weight of from 15,000 to 80,000.

* * * * *

UNITED STATES PATENT AND TRADEMARK OFFICE
CERTIFICATE OF CORRECTION

| | |
|---|---|
| PATENT NO. | : 9,120,925 B2 |
| APPLICATION NO. | : 13/576839 |
| DATED | : September 1, 2015 |
| INVENTOR(S) | : Rahul Sharma, Thomas Oswald and Jill Martin |

It is certified that error appears in the above-identified patent and that said Letters Patent is hereby corrected as shown below:

Claims

Column 19, Line 39, Claim 4, replace "acryltate" please add --acrylate--

Column 20, Line 33, Claim 14, replace "haiogenated" please add --halogenated--

Signed and Sealed this
Ninth Day of February, 2016

Michelle K. Lee
*Director of the United States Patent and Trademark Office*